United States Patent [19]
Johnson et al.

[11] 3,813,892
[45] June 4, 1974

[54] WATER PURIFICATION SYSTEM

[75] Inventors: Wallace E. Johnson; James H. Fraser, both of Topsfield, Mass.

[73] Assignee: Avco Corporation, Cincinnati, Ohio

[22] Filed: Aug. 23, 1971

[21] Appl. No.: 173,991

[52] U.S. Cl. .................................................. 62/58
[51] Int. Cl. ............................................. B01d 9/04
[58] Field of Search ..................................... 62/58

[56] References Cited
UNITED STATES PATENTS

| | | | |
|---|---|---|---|
| 3,049,889 | 8/1962 | Carfagno | 62/58 |
| 3,070,969 | 1/1963 | Ashley et al. | 62/58 |
| 3,073,131 | 1/1963 | Ashley | 62/58 |
| 3,170,778 | 2/1965 | Roth | 62/58 |
| 3,218,817 | 11/1965 | Tooke | 62/58 |
| 3,304,734 | 2/1967 | Dunn | 62/58 |
| 3,338,064 | 8/1967 | Karnofsky | 62/58 |
| 3,400,549 | 9/1968 | Karnofsky | 62/58 |
| 3,478,531 | 11/1969 | Karnofsky | 62/58 |
| 3,528,256 | 9/1970 | Karnofsky | 62/58 |
| 3,587,859 | 6/1971 | Probstein | 62/58 |
| 3,614,874 | 10/1971 | Martindale et al. | 62/58 |

*Primary Examiner*—Norman Yudkoff
*Assistant Examiner*—R. T. Foster
*Attorney, Agent, or Firm*—Charles M. Hogan, Esq.; Abraham Ogman, Esq.

[57] ABSTRACT

A water purification system useful, for example, in the desalination of saline water, which system uses means for crystallizing the water in such saline solution through the use of an appropriate refrigerant to form a slurry of ice crystals and brine which is fed to a wash column for separating the brine from the ice crystals. The ice crystals form a porous ice bed for movement through the column, such bed being washed by a wash liquid flowing in direction counter to the ice bed movement. Ice is removed at one end of the column and brine and wash water is removed through an intermediate permeable port of the column, the ice preferably being melted by indirect heat exchange with vaporized refrigerant. The pressure relationships at the input end of the ice bed, at the intermediate permeable port, and at the output end of the ice bed are controlled independently of the pressures at the crystallizer and at the melter units of the system, such pressures being capable of adjustment in accordance with the size of the ice crystals formed in the crystallizer (and, hence, the permeability of the porous ice bed formed in the wash column) to provide for maximum ice output from the column and minimization of wash liquid loss therein.

12 Claims, 1 Drawing Figure

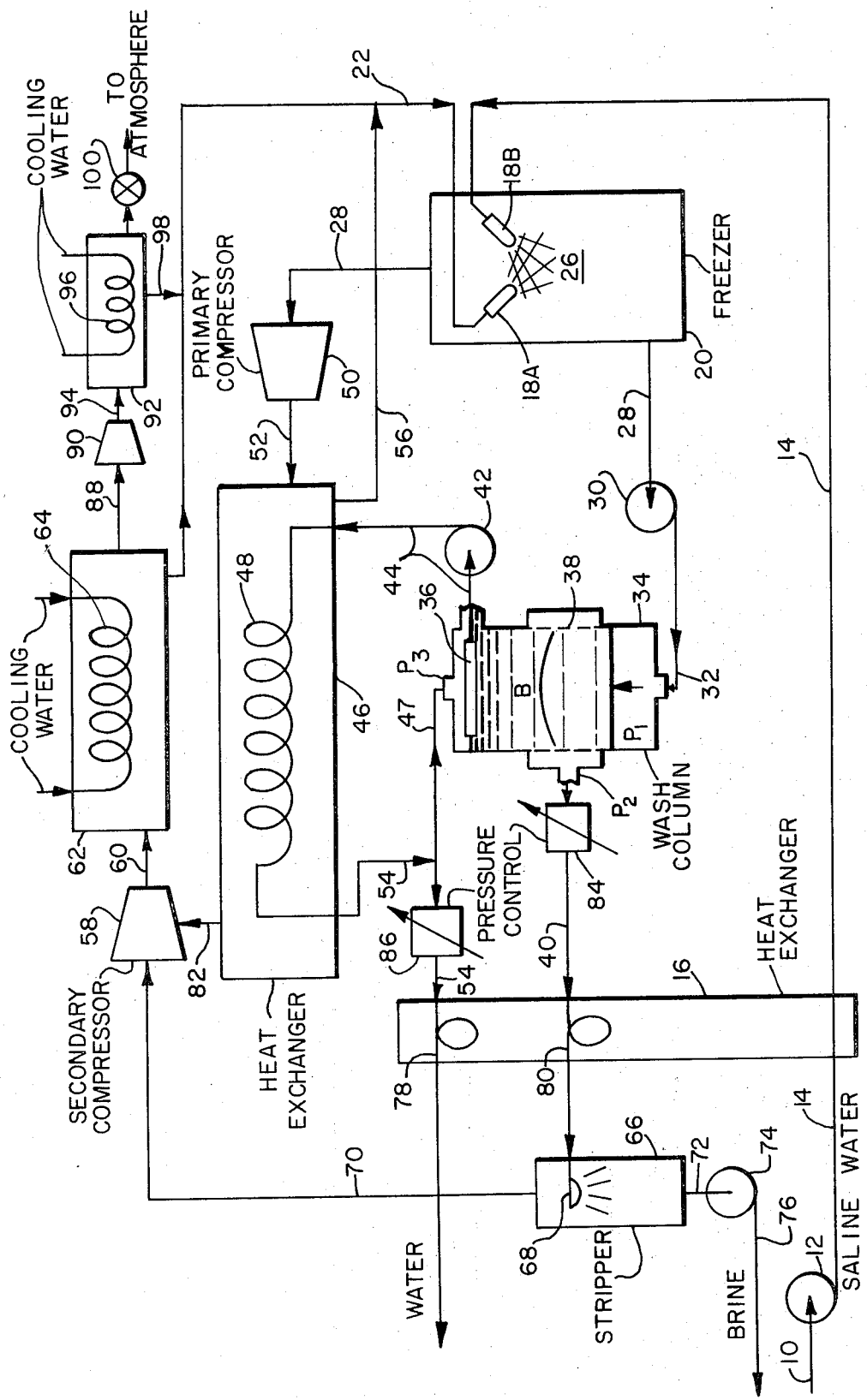

3,813,892

WATER PURIFICATION SYSTEM

INTRODUCTION

The present invention relates generally to the purification of water including the desalination of saline water and, more particularly, to the purification thereof by the use of freezing, or crystallization, processes.

In recent years there has been wide development of freezing processes, particularly as used for the desalination of saline water. These processes are based on the principle that, when a saline solution is frozen, ice crystals containing pure water are formed in a concentrated salt solution (brine), which crystals effectively exclude all salts present in the solution. Although this invention is useful in such applications and will be described in a particular embodiment thereof in connection with such use, it is not intended that the system be limited thereto since it will also be useful in the purification of water containing impurities other than sea water salt. Moreover, the system may be useful in producing concentrated solutions of materials wherein the crystals produced are removed from the system as waste and the concentrated solution separated therefrom represents the desired output product.

DESCRIPTION OF THE PRIOR ART

Typical crystallization processes, which are described, for example, in U.S. Pat. No. 3,937,554 issued to E. R. Gilliland et al. on June 16, 1965, and in U.S. Pat. No. 3,400,549 issued to G. B. Karnofsky on Sept. 10, 1968, use a system which mixes a liquid refrigerant, such as propane, butane, or various hydrocarbon refrigerants, for example, with cooled saline water. The mixed liquids are placed in a chamber at an appropriately reduced pressure whereupon the refrigerant evaporates, its latent heat of vaporization thereby cooling the water to a temperature where ice crystals form. The resultant slurry of brine and ice crystals is fed to one end of a gravity operated wash column (such as in Gilliland et al.) or to a wash column having pressures determined by the pressures in the freezing and melting units (as in Karnofsky). Brine is discharged from an intermediate point of the wash column and the ice crystals are extracted at the opposite end thereof. The ice crystals are melted by directly mixing the refrigerant vapor with the ice crystals so that the refrigerant is condensed into a liquid form and the ice crystals are melted. The product water is contained in the resultant mixture of condensed refrigerant and melted ice crystals, and the refrigerant is appropriately stripped from the mixture to produce the pure desalinated output water product. A portion of the product water is passed back to the wash column and directed in a counter-current manner with reference to the slurry of brine and ice crystals to wash adhering brine from the crystals.

In such prior known systems which generally utilize gravity operated wash columns, or wash column where no pressure control, or very limited pressure control, is permitted, the input ice crystal slurry is fed to the bottom of a vertically oriented wash column, and forms an ice bed which moves through the column, the brine exiting from the bottom of the column under gravity force (as in Gilliland) or at a point intermediate the top and bottom of the column (as in Karnofsky). A wash liquid is introduced at the top of the column and flows downwardly in a direction counter to the direction of movement of the ice bed to wash the adhering brine from the ice crystals in the bed. The wash water flows downwardly and exits from the column together with the brine due to gravity force (as in Gilliland) or exits with the brine at an intermediate point at a reduced pressure which is set at a value between the pressure of the melter unit and the pressure of the freezer unit (as in Karnofsky).

In such systems, the rate of movement of the ice bed through the column is directly proportional to the pressure across the ice bed, the proportionality constant representing the permeability of the ice bed. In accordance with this relationship it has been reasoned by the designers of such prior art systems that, since the pressures within the column and, hence, across the ice bed are subject to little or no control and must be determined by the pressures at the melter and at the freezer units, the higher one can make the permeability of the ice bed, the greater the rate of ice bed movement therethrough and, hence, the greater the ice product output therefrom.

Since permeability is proportional to the square of the size of the ice crystals making up the ice bed (accordingly, the larger the crystals the greater the permeability), the crystallization processes which have been proposed are usually arranged purposely to produce relatively large size ice crystals in order to effect an improvement in the separation process so that an improvement in overall product output can be achieved. The requirement for as large ice crystals as practically feasible is discussed, for example, in the crystallization processes shown in the exemplary U.S. Pat. No. 3,148,143 (Donath) dated Sept. 8, 1964, No. 3,217,505 (Tuwiner) dated Nov. 16, 1965, No. 3,368,362 (Smith) dated Feb. 13, 1968 and No. 3,525,230 (Smith) dated Aug. 25, 1970.

However, the use of such large size crystals, which, for example, may lie within a range from 0.5 mm. to 2.0 mm., or larger, requires a relatively long "retention time" in the freezer vessel, that is, the time required to form or build up such crystals therein. The requirement for long retention times clearly reduces the effectiveness of the freezer system since the rate of formation of useable ice crystals is thereby relatively slow. Usually, such large crystals are produced by using a liquid refrigerant which is inserted into the freezer, or crystallization, vessel and is thoroughly mixed, by an appropriate stirring means, with the liquid saline solution which has also been inserted therein. The effectiveness of prior art systems was then achieved by adjusting the crystallization process thereof to provide the best compromise between the requirement for relatively large crystal sizes, with relatively long retention times, for obtaining the most effective wash column operation and the desire to use relatively short retention times, with the formation of relatively smaller crystal sizes, to obtain the most effective freezer vessel operation.

A further problem that may arise with some systems of the above type is that refrigerants, such as butane, impose an environmental hazard, due to their explosive nature, thereby limiting their use, particularly in relatively small plants wherein explosion-proof equipment may represent a significant part of the overall cost of the plant. Moreover, in systems wherein the condensation of the refrigerant is achieved by direct contact with the ice crystals from the wash column, the water must be stripped free of refrigerant before it is available in pure form.

In the system of this invention, however, the ice crystals formed in the freezer vessel are fed to a pressurized wash column, that is, a wash column of the type generally described in U.S. Pat. No. 3,587,859, issued to R. F. Probstein and J. Shwartz on June 28, 1971, wherein the relationships among the pressures at the upper end of the porous ice bed at one end of the column, at the lower end of the porous ice bed within the column, and at an intermediate position in the column where the brine exits are subject to control independently of gravity or other forces present in the column and independently of the pressures in the freezer and melter units of the system. Because of the use of such a controllable pressurized wash column, the overall system provides an improved rate of output water product relatively independent of the ice crystal size which is used. Accordingly, the pressure relationships can be appropriately adjusted in accordance with the size of the ice crystals from the freezer vessel, and, if desired in some applications, such crystals can be made relatively smaller than those normally used in previously known freezer systems, with an accompanying decrease in the size and cost of the freezer unit.

The capability of producing smaller crystal sizes can be enhanced in a preferred embodiment of the invention, for example, by the use of spray techniques for inserting the refrigerant and the saline water into the freezer vessel. Insertion thereof in spray form tends to provide more intimate contact between the refrigerant and saline solution so that relatively small ice crystals can be rapidly formed in the freezer vessel. The fact that smaller crystals can be used in the system of the invention, and consequently a smaller and less expensive freezer vessel, allows for the removal of crystals from the freezer vessel at a faster rate because of the relatively lower retention times required.

Since the output product rate can be controlled by controlling the pressure relationships used to produce the ice bed movement through, and the wash water and brine removal from, the wash column independently of the pressure in the freezer and melter units, such pressure relationships can be maintained at values which permit the maximization of ice product output and the minimization of wash water loss. Since such pressure relationships can be controllably adjusted in accordance with the permeability of the ice bed (and, hence, the size of the ice crystals therein), the wash column operation can be arranged to handle ice beds having relatively low permeabilities (i.e., small crystal sizes) or relatively high permeabilities (i.e., large crystal sizes) while still providing for maximum output product rates.

In summary, this invention takes advantage of the ability to control such pressure relationships in the wash column independently of the pressures in the melter and freezer units to permit the use of ice crystals of selected sizes, which in some applications may preferably be smaller than those used in presently known systems with the consequent use of shorter retention times in the freezer and an overall improved efficiency in, and costs of, the manufacture and operation of the entire system.

More specifically, and as pointed out in further detail below, such results are achieved by a system using a freezer vessel which evaporates a refrigerant in direct heat exchange relationship with contaminated water, such as saline water, the refrigerant and saline solution being preferably supplied to the freezer vessel by the use of spray nozzle techniques to produce refrigerant vapor and a slurry of relatively small ice crystals and brine. The slurry is passed to one end of a controllable pressurized wash column in which, as discussed above, a movable porous ice bed is formed and from which brine is extracted from an intermediate point in the column. The relationships among the pressures at the ends of the ice bed and at the intermediate point are controlled so as to maximize the output of product ice from the column and to minimize the loss of wash water used to remove the brine adhering to the ice crystals. The refrigerant vapor is passed in indirect heat exchange relationship with the extracted ice crystals thereby condensing the refrigerant to a liquid form and melting the ice crystals to produce the purified water output. A portion of the purified water output is directed to the wash column as a wash liquid for flow therein in a direction opposite to the movement of the ice bed and out from the column with the brine. As mentioned above, the pressure relationships in the wash column are arranged to produce the most efficient washing of the adhering brine from the ice crystals with a minimization of wash water loss. Any refrigerant that is present in the brine output can be recovered in an appropriate stripping operation in which refrigerant is evaporated therefrom for ultimate condensation for reuse in the freezer operation.

The above and other related advantages of the present invention will become clearer from the more detailed description of the invention described with the reference to the accompanying drawings wherein the single FIGURE in the drawing is a schematic view of a desalination process embodying the present invention.

Referring to the drawing, there is shown a process for desalinating water comprising a feed conduit 10 receiving a suitable source of saline water. While the system is described particularly with reference to the desalination of saline water, as mentioned above it is intended broadly to be used also for the purification of any water that has dissolved solids in it, including industrial wastes. The feed conduit 10 extends to a pump 12 which discharges the saline water into a conduit 14 passing through a saline water heat exchanger 16 and through nozzle 18B into the freezer vessel 20.

While freezer vessel 20 may take a variety of specific forms, it is generally preferable that it be arranged to provide for the mixing of the saline solution with a liquid refrigerant in direct contact and evaporating the refrigerant. The latent heat of vaporization of the refrigerant is absorbed from the saline water and cooles it sufficiently to produce ice crystals and brine. In one known form (not shown) the freezer may comprise a chamber in which a liquid refrigerant and saline water are injected into a vessel via appropriate ports, the mixture thereof being stirred at a pressure slightly below the vapor pressure of the refrigerant at the freezing point of water. The refrigerant evaporates and in the process freezes a portion of the water.

Another method of freezing the saline water, and one which seems preferable and is illustrated schematically herein, utilizes a liquid refrigerant obtained from conduit 22 and passed to a spray nozzle 18A in chamber 26. The input saline water from conduit 14 is passed to a spray nozzle 18B in chamber 26. The sprays from the nozzles are directed toward each other within the chamber and come into intimate contact so that ice crystals and vaporized refrigerant are thereby produced. While two separate nozzles are shown, a single nozzle assembly having appropriate output apertures for the sprays may be used. Moreover, a plurality of nozzles or nozzle output apertures for either the saline solution or the refrigerant may also be used.

The refrigerant used may be one of a number of non-toxic, non-inflammable fluorocarbon compounds such as Freon 114, Freon 115, and Freon 318, the use of which avoids the necessity for providing expensive fire and explosion-proof safety equipment throughout the system particularly where the system may be designed for relatively limited capacity wherein the costs of such equipment may represent a significant portion of the costs of the overall system. Where the costs of such safety equipment is justified, particularly in relatively large installations, it may be desirable to use butane, or refrigerants similar thereto.

The pressure in chamber 26 is maintained slightly below the vapor pressure of the refrigerant at the freezing point of water. As a consequence, the refrigerant evaporates and causes the water to freeze and form a slurry of brine (i.e., concentrated saline solution) and ice crystals at or near the bottom of chamber 26. The refrigerant in vapor form produced in the upper portion of chamber 26 is discharged from chamber 26 via conduit 28.

The slurry of brine and ice crystals is passed from the bottom of chamber 26 by conduit 28 to a pump 30 where the slurry is fed through a conduit 32 to one end of controllable pressurized wash column 34. The wash column 34 is of the type described in the above references Probstein et al. patent and discussed generally above and in a preferred embodiment comprises a column having an inlet port fed by conduit 32 at one end thereof and an ice crystal output removal means, such as scraper 36, at the other end thereof. A permeable outlet port 38 intermediate the ends of the wash column connects with a discharge conduit 40. The slurry forms a porous bed B of ice crystals within the column extending from a point generally just below intermediate permeable port 38 to the top of the column, which iced bed moves upwardly through the column.

A portion of the output product water from a heat exchanger 46 is supplied to the output end of wash column 34 via conduit 47, a first portion thereof being directed downwardly therein to provide the wash water required to remove the brine from the ice crystals in the porous bed and a second portion thereof being used to convey the iced crystals in the form of a water-crystal slurry from the column to a pump 42 via conduit 44. The rate of flow of slurry into the column is controlled by the pump 30 and determines the pressure $P_1$ at the input end of the ice bed B. Pressure control means 84 and 86 are used to control the pressures at the intermediate permeable port 38 and at the output end of ice bed B where wash water is inserted, respectively. From the output end of column 34 the ice crystal slurry is fed into conduit 44 by pump 42 through a flow path represented by reference numeral 48 which extends through heat exchanger 46 to a discharge conduit 54. Conduit 47 extends from conduit 54 back to the wash column 34 to supply the wash and slurry water as discussed above.

Heat exchanger 46 has refrigerant vapor inserted therein via conduit 52 from a primary compressor 50 connected to conduit 28, in turn connected to crystallizer unit 20. The refrigerant vapor is in indirect heat exchange relationship with the slurry of ice crystals which flows through closed flow path 48. In other words, the refrigerant vapor and slurry of ice crystals do not come into direct contact with one another. The resultant heat transfer causes the ice crystals to be melted and most of the refrigerant vapor present in heat exchanger 46 is condensed into a liquid where it is passed outwardly via conduit 56 from heat exchanger 46 to conduit 22 and thence to freezer vessel 20.

A conduit 82 is used to remove excess refrigerant vapor that has not been condensed in heat exchanger 46. This vapor is pressurized by a secondary compressor 58 and passed through a conduit 60 to a secondary heat exchanger 62 which has an indirect heat exchange flow path 64 through which a cooling liquid, such as cool water, flows to condense the refrigerant vapor to a liquid form. The condensed vapor is thereupon supplied to freezer vessel 20 via conduit 22.

The uncondensed vapors remaining in secondary heat exchanger 62, which consist primarily of air and volatile substances other than refrigerant vapor, although a small amount of refrigerant vapor not condensed in heat exchanger 62 also may be present, are vented to the atmosphere as follows. A portion of the vapor content of heat exchanger 62 is passed via conduit 88 to a compressor 90, the compressed vapor then being supplied to a heat exchanger 92 via conduit 94 where it is indirectly cooled by a cooling liquid flowing in a flow path 96 therein, the pressure of such vapor content being maintained at a relatively high value (e.g., 2,000 psi) so that the major part of any residual volatile refrigerant contained therein is condensed and supplied from heat exchanger 92 to conduit 22 via a conduit 98 and only a small controlled part thereof is vented to the atmosphere with the remaining volatile substances as discussed below. The remaining vapors, i.e., air and other volatile materials which are not condensed, are vented to the atmosphere via an appropriately controlled throttle valve 100.

Any refrigerant that may be mixed with the brine that is discharged from port 38 of wash column 34 can be recovered by feeding it to an appropriate stripper chamber 66 maintained at a relatively low pressure. The brine is sprayed through a nozzle 68 into the chamber where the lowered pressure causes the refrigerant to evaporate. Conduit 70 connects the refrigerant vapor to the secondary compressor 58 where it joins the vapor from heat exchanger 46 for condensation in heat exchanger 62. The liquid brine is discharged from stripper chamber 66 through conduit 72 to a pump 74 for final discharge through conduit 76.

The product output water from conduit 54 and the brine output from conduit 40 have separate flow paths 78 and 80, respectively, through heat exchanger 16 in indirect heat exchange relationship with inlet conduit 14 carrying the input saline solution. If any undesirable amount of refrigerant is present in the product output water, the latter can be stripped thereof by an appropriate stripper device similar to that discussed above with reference to the removal of refrigerant from the brine output.

In the operation of the system described above, saline water in conduit 10 is fed by pump 12 through heat exchanger 16 where it is cooled by the discharging brine and desalinated product output water in flow paths 78 and 80, respectively, to a temperature just above freezing. The saline water and the liquid refrigerant are sprayed into chamber 26 of freezer 20, the intimate spray contact of saline water and refrigerant causing the refrigerant to vaporize and the pure water contained in the saline solution to freeze into ice crystals. A slurry comprising such ice crystals and brine is fed by pump 30 through conduit 32 to pressurized wash column 34.

The wash column 34 is arranged so that the relationships among the pressures $P_1$, $P_2$ and $P_3$ at the input end of the ice bed, at the intermediate port 38, and at the output end of the ice bed, respectively, can be controlled independently of the pressures at the melter 46 and the freezer 20.

The slurry enters one end of wash column 34 and a porous bed of ice crystals is formed therein, which bed moves through the column substantially as a result of the controllable pressure difference ($P_1-P_3$) at ends of the ice bed. The pressure $P_2$ at port 38 is maintained at a value between $P_1$ and $P_3$ and provides for a flow of brine upwardly through the ice bed and a flow of wash water downwardly through the ice bed, both brine and wash water flowing from the column at permeable port 38. Preferably the pressures are arranged to maintain the ice bed length so that it extends from a point just below port 38 to the output end of column 34, as discussed in the above Probstein et al. patent. The pressure relationship ($P_3-P_2$) is maintained at a value such that a minimization of the loss of wash water introduced at the output end of the column results.

The ice crystals at the output end of the column are removed by an appropriate scraper means and, together with a portion of the product water from conduit 47, form an output slurry of pure water and ice crystals. This slurry is fed by pump 42 through the heat exchanger 46 wherein the ice crystals in flow path 48 are melted by the indirect heat exchange relationship with the vapor introduced into heat exchanger 46 from compressor 50. The pure water resulting therefrom is fed from heat exchanger 46 via conduit 54, a portion thereof being fed by conduit 54 through heat exchanger 16 to provide the output product of desalinated, or pure, water.

As mentioned above, another portion of the water in conduit 54 is applied to the wash column 34 through conduit 47, a small part of which provides the wash water flowing in a direction counter to the direction of the ice bed movement and the remaining part of which is used to form the slurry of ice crystals conveyed through conduit 44 to heat exchanger 46, as discussed above. Ideally, as mentioned above, the pressure relationship ($P_3-P_2$) is maintained so that the flow of the wash water is just sufficient to displace the brine from the crystals in the ice bed and the wash water loss is thereby minimized.

In a preferred embodiment of the invention used to provide a most effective melting operation, the ice crystals comprise a relatively small part of the total volume of the slurry which is conveyed from the wash column 34 to heat exchanger, or melter 46. The largest part of that total volume comprises a part of that portion of pure water which is removed from heat exchanger 46 and is carried by conduit 47 to the top of the wash column. The major portion of the pure output water from heat exchanger 46 is directed to conduit 47, the larger part of such portion being used to form the slurry at the output of wash column 34 and a smaller part thereof being used to provide the wash water for wash column 34, as mentioned above. Accordingly, most of the volume of pure water obtained from heat exchanger 46 is, in effect, continuously recirculated in the loop comprising conduits 47 and 44, flow path 48, and a portion of conduit 54. In a practical embodiment of the invention the slurry of pure water and ice crystals from wash column 34 may comprise approximately 90 percent by volume of pure water and approximately 10 percent by volume of ice crystals. Further, about 10 percent of the water from heat exchanger 46 may be carried from the system as output water product via conduit 54, while about 90 percent thereof is returned to the output end of wash column via conduit 47 to form the water-ice crystal slurry and to provide the wash water therefor. Effectively then all of the ice crystal output which is removed from the ice bed B of wash column 34 by scraper 36 is melted to form the output water product and substantially constant amount of pure water is continuously recirculated as discussed above.

The refrigerant vapor in heat exchanger 46 is condensed into a liquid for recirculation via conduit 56 to conduit 22 and re-evaporation in freezer vessel 20. Since a portion of the vapor is not condensed in heat exchanger 46, due to thermodynamic inefficiencies, the remaining vapor is fed via conduit 82 to a secondary compressor 58 where it is pressurized and fed to secondary heat exchanger 62, where it is cooled by appropriate cooling water and condensed into liquid and fed to conduit 22. The other vapors, primarily air, in heat exchanger 62 are vented to the atmosphere through the use of compressor 90, heat exchanger 92 and throttle valve 100 with further condensed refrigerant fed to conduit 22. Any refrigerant that remains in the brine exiting from wash column 34 is removed by the stripper chamber 66 and fed to compressor 58 via conduit 70 before the brine is discharged.

The cooling liquid used in heat exchangers 62 and 92 may be supplied by a portion of the output brine, a portion of the output product water, or a combination of both. In the latter case, each liquid flows through the heat exchangers in separate flow paths so that no direct mixture thereof occurs. An advantage of using the cooled brine is that in the heat exchange process the brine is heated and the stripper operation in stripper 66 is thereby made more efficient than it would be if brine at a lower temperature is fed thereto.

Several advantages are evident from the description of the above process. The use of a pressurized wash column permits the pressure relationships among the pressures $P_1$, $P_2$ and $P_3$ to be controlled independently of the pressures in freezer 20 melter 46 so as to maximize the output ice product therefrom in accordance with the ice crystal sizes which are used in the slurry supplied to wash column 34 with such pressure relationship being appropriately adjusted for different permeabilities of the ice bed formed in the wash column. The rate of formation of useable ice crystals in the freezer vessel can be increased by providing a system designed for use with relatively smaller ice crystals than those used in presently known systems. The ability to produce the small crystal sizes at a higher rate is enhanced by the use of a spray nozzle arrangement and, accordingly, a smaller freezer vessel can be used.

Moreover, in a preferred embodiment of the invention, the ice crystals from the wash column are melted by an indirect heat exchange relationship with the refrigerant vapor from compressor 50. Such a system prevents recontamination of the desalinated water by the refrigerant and/or other volatile materials which would be carried along with the refrigerant vapor produced in freezer vessel 20 and eliminates the need for further stripper devices for separating the contaminants from the output product water. Thus, the ability of the process to be used in treating industrial waste water where volatile substances may be a significant source of the pollutants in the water to be purified is greatly enhanced. Further, the use of an indirect melting process simplifies the implementation of the system. In a direct melting process the pressure of the slurry at the output of wash column 34 would be reduced to that in the melter vessel and the pressure of the output water would have to be increased by a suitable pumping process to permit a portion of such output product water to be used at the output end of the pressurized column.

Furthermore, the use of a controllable pressurized wash column enables the product water and brine to be passed through heat exchanger 16 without additional pumping stages. The elimination of these two pumping stages greatly enhances the reliability and economics of the process.

As an example of a system used in accordance with the invention for ice crystals formed in a range of sizes from approximately 0.10 mm. to approximately 0.15 mm., the pressures $P_1$, $P_2$ and $P_3$ are maintained at values of about 100 psia, 45 psia, and 100 psia, respectively, to provide for an ice output production from the wash column between 5,000 to 10,000 pounds/hour/square foot of cross-sectional area of the wash column, which production is as much as thirty times that available from any known system in operation at this time.

As an example of the pressure relationships utilized with relatively larger crystal sizes, in the order of approximately 0.25 mm. on the average, pressures of about 50 psia, 45 psia and 48 psia, respectively, can be used to provide an ice output production in the same general range.

What is claimed is:

1. A process of processing a liquid comprising the steps of:
   contacting a liquid refrigerant in a first heat exchange relationship in a crystallization zone with said liquid to cool said liquid, thereby producing refrigerant vapor and a slurry comprising solid crystals having sizes within a selected range and a concentrated solution of said liquid;
   removing said slurry from said crystallization zone and inserting said removed slurry into a bottom end of a wash zone;
   extracting the concentrated solution from said slurry at an intermediate point in said wash zone to form a porous bed of said solid crystals for movement through said wash zone toward the top end thereof, said porous bed having a bottom input end within said zone and a top output end of said wash zone;
   pumping a slurry of solid crystals in a carrier liquid from said top output end of said wash zone to a liquefying zone;
   extracting refrigerant vapor from said crystallization zone;
   pressurizing said extracted refrigerant vapor to enable said refrigerant to be condensed at the temperature of said solid crystals and passing said pressurized vapor through said liquefying zone in indirect heat exchange relationship with the slurry of solid crystals therein, thereby condensing at least a portion of said refrigerant vapor to a liquid form and liquefying said solid crystals as melt;
   removing a portion of said melt from said liquefying zone as processed liquid output; and
   circulating a remaining substantial portion of said melt to said top end of said wash zone to provide a carrier liquid for carrying said solid crystals to said liquefying zone and to provide a wash liquid for downward flow within said wash zone in a direction counter to the direction of movement of said porous bed therein and out from said wash zone at said intermediate point thereof; and
   controlling the pressure relationships at the input end of said porous bed, at said intermediate point, and at the output end of said porous bed, respectively, independently of the pressures in said crystallization zone and said liquefying zone.

2. A process as in claim 1 wherein
   said liquid is contaminated water;
   said solid crystals are ice crystals; and
   said processed liquid output is purified water.

3. A process as in claim 2 wherein
   said contaminated water is a saline solution; and
   said concentrated solution of said contaminated water is brine.

4. A process as in claim 2 wherein said liquid refrigerant directly contacts said contaminated water in said crystallization zone and further comprising the step of cooling said decontaminated water to a temperature just above freezing before the refrigerant is evaporated in said direct contact with it.

5. A process as in claim 1 wherein said output end of said wash zone and said liquefying zone form part of a substantially closed circulatory system to maintain the pressure within the circulatory system substantially constant and said substantial portion of said processed liquid is circulated through said closed circulatory system.

6. A process as in claim 1 plus the additional step of adjusting the pressure relationships among the pressures $P_1$, $P_2$, and $P_3$ at the input end of said porous bed, at said intermediate point, and at the output end of said porous bed, respectively, independently of the pressures in said crystallization zone and said liquefying zone, to move said porous bed through said wash zone at a selected rate so as to maximize the rate of extraction of said solid crystals from said zone in accordance with said selected range of sizes of said solid crystals produced by said first heat exchange relationship and so as to minimize the loss of said wash liquid from said wash zone.

7. A process as in claim 2 and further comprising the step of:
   passing the liquid refrigerant formed after said heat exchange relationship with said extracted ice crystals to said crystallization zone for said first heat exchange relationship with said contaminated water.

8. A process as in claim 7 wherein said refrigerant vapor is partially condensed by said indirect heat exchange relationship with said extracted ice crystals and wherein said process further comprises the steps of:
pressurizing the refrigerant vapor remaining after the indirect heat exchange relationship with said extracted ice crystals;
passing said pressurized remaining refrigerant vapor through a first refrigerant vapor condensing zone in indirect heat exchange relationship with a coolant to at least in part condense said pressurized remaining vapor to a liquid form; and
passing said remaining liquid refrigerant to said crystallization zone for said first heat exchange relationship with said contaminated water.

9. A process as in claim 8 and further including the step of venting to the atmosphere vapors, other than refrigerant vapor, that are present after said indirect heat exchange between said vaporized refrigerant and said extracted ice crystals.

10. A process as in claim 9 wherein said venting step further includes the steps of
extracting from said first refrigerant vapor condensing zone substantially all vapors contained therein including any refrigerant vapor that is not condensed to a liquid in said first refrigerant vapor condensing zone;
pressurizing said vapors extracted from said first refrigerant vapor condensing zone;
passing said extracted pressurized vapors to a second refrigerant vapor condensing zone in indirect heat exchange relationship with a further coolant to condense said previously uncondensed refrigerant vapor;
passing said pressurized vapors, other than said refrigerant vapor, to the atmosphere; and
passing said condensed refrigerant vapor to said crystallization zone.

11. A process as in claim 8 further comprising the steps of exposing said concentrated solution extracted from said wash zone to a low pressure region whereby refrigerant in said concentrated solution is evaporated into a vapor form;
extracting said refrigerant vapor from said low pressure region; and
pressurizing said extracted vapor and introducing said pressurized vapor into said first refrigerant vapor condensing zone and mixing it therein with said pressurized remaining refrigerant vapor.

12. A process as in claim 2 and further comprising the steps of
controlling the rate of removal of said slurry from said crystallization zone so as to maintain the sizes of said ice crystals therein within a selected range; and
adjusting the relationships among said pressures $P_1$, $P_2$ and $P_3$ so as to maintain said selected rate of movement of said ice bed through said wash zone.

* * * * *

UNITED STATES PATENT OFFICE
CERTIFICATE OF CORRECTION

Patent No. 3,813,892    Dated June 4, 1974

Inventor(s) Wallace E. Johnson and James H. Fraser

It is certified that error appears in the above-identified patent and that said Letters Patent are hereby corrected as shown below:

Col. 9, line 36, for "100 psia" (first occurrence), read --- 110 psia ---.

Signed and sealed this 17th day of September 1974.

(SEAL)
Attest:

McCOY M. GIBSON JR.
Attesting Officer

C. MARSHALL DANN
Commissioner of Patents